United States Patent [19]

Altermatt

[11] Patent Number: 4,667,023
[45] Date of Patent: May 19, 1987

[54] 4-(2'-HALO-4'-NITROPHENYLAZO)-2-2[2'-(C$_{1-2}$ALKOXY OR 2''-METHOXYETHOXY)ETHOXYCARBONYLAMINO —N,N-DI-C$_{2-3}$ALKYLANILINES

[75] Inventor: Ruedi Altermatt, Buckten, Switzerland

[73] Assignee: Sandoz Ltd., Basel, Switzerland

[21] Appl. No.: 382,680

[22] Filed: May 27, 1982

Related U.S. Application Data

[63] Continuation of Ser. No. 835,321, Sep. 21, 1977, abandoned, which is a continuation-in-part of Ser. No. 568,105, Apr. 14, 1975, abandoned, which is a continuation-in-part of Ser. No. 487,195, Jul. 10, 1974, abandoned.

[30] Foreign Application Priority Data

Jul. 16, 1973 [CH] Switzerland .................. 10333/73
Sep. 24, 1976 [CH] Switzerland .................. 12132/76

[51] Int. Cl.$^4$ ............... C09B 29/01; C09B 29/085; D06P 1/18; D06P 3/54
[52] U.S. Cl. ........................................... 534/732
[58] Field of Search ..................... 260/207, 207.1; 534/732

[56] References Cited

U.S. PATENT DOCUMENTS

| | | | |
|---|---|---|---|
| 3,342,804 | 9/1967 | Mueller | 260/207.1 |
| 3,359,256 | 12/1967 | Mueller et al. | 260/205 |
| 3,398,135 | 8/1968 | Mueller | 260/205 |
| 3,642,767 | 2/1972 | Hahn et al. | 260/158 |
| 3,652,534 | 3/1972 | Wegmuller | 260/207 |
| 4,038,269 | 7/1977 | Groebke | 260/207 |
| 4,042,580 | 8/1977 | Groebke | 260/207 |

FOREIGN PATENT DOCUMENTS

| | | | |
|---|---|---|---|
| 766772 | 5/1971 | Belgium | 260/207 |
| 1928372 | 2/1970 | Fed. Rep. of Germany | 260/207.1 |
| 1241705 | 8/1971 | United Kingdom | 260/207.1 |

OTHER PUBLICATIONS

Venkataraman, *The Chemistry of Synthetic Dyes*, vol. I, Academic Press, New York (1952), pp. 452, 454 and 457–460.

*Primary Examiner*—Floyd D. Higel
*Attorney, Agent, or Firm*—Gerald D. Sharkin; Richard E. Vila; Melvyn M. Kassenoff

[57] ABSTRACT

Monoazo compounds of the formula

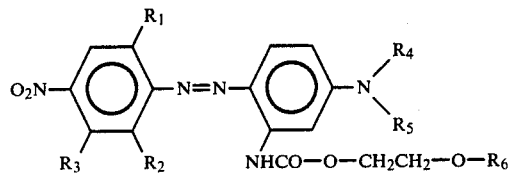

wherein
$R_1$ is chloro, bromo nitro, $C_{1-4}$alkylsulfonyl, phenylsulfonyl, ($C_{1-4}$alkyl)carbonyl or benzoyl,
each of $R_2$ and $R_3$, independently, is hydrogen, chloro or bromo, with the proviso that at least one of $R_2$ and $R_3$ is hydrogen,
each of $R_4$ and $R_5$, independently, is $C_{1-4}$alkyl,

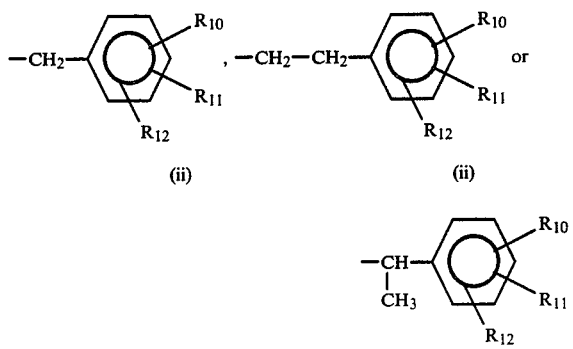

or
in which each of $R_{10}$, $R_{11}$ and $R_{12}$, independently, is hydrogen, chloro, bromo, methyl, methoxy or ethoxy, and
$R_6$ is $C_{1-4}$alkyl, ($C_{1-4}$alkoxy)$C_{2-4}$alkyl, phenyl or phenyl substituted by up to three substituents selected from the group consisting of choro, bromo, methyl, methoxy and ethoxy, which compounds are useful as disperse dyes for substrates consisting of or comprising hydrophobic, high molecular weight synthetic or semi-synthetic organic fibers such as polyesters, synthetic polyamides and cellulose 2½ acetate and triacetate. The dyeings exhibit notable fastness to light, thermofixation, sublimation, pleating, wet treatments, perspiration, solvents, lubricants, rubbing, cross dyeing, ozone, gas fumes and chlorine and stability to reduction when dyed with wool. The dyes build-up particularly well on polyesters.

8 Claims, No Drawings

4-(2'-HALO-4'-NITROPHENYLAZO)-2-2[2'-(C$_{1-2}$ALKOXY OR 2''-METHOXYETHOXY)ETHOXYCARBONYLAMINO —N,N-DI-C$_{2-3}$ALKYLANILINES

This application is a continuation of application Ser. No. 835,321, filed Sept. 27, 1977 and now abandoned, which is a continuation-in-part of application Ser. No. 568,105, filed Apr. 14, 1975 and now abandoned, which in turn is a continuation-in-part of application Ser. No. 487,195, filed July 10, 1974 and now abandoned.

The present invention relates to azo compounds of low solubility in water, their production and use.

More particularly, the present invention provides monoazo compounds of formula I,

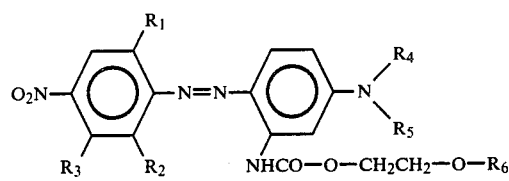

in which
$R_1$ signifies a chlorine or bromine atom or a nitro, ($C_{1-4}$)alkylsulphonyl, phenylsulphonyl, ($C_{1-4}$)alkylcarbonyl or benzoyl radical,
each of $R_2$ and $R_3$, independently, signifies a hydrogen, chlorine or bromine atom, with the proviso that at least one of $R_2$ and $R_3$ signifies a hydrogen atom,
each of $R_4$ and $R_5$, independently, signifies a ($C_{1-4}$)alkyl radical or a radical of formula (i), (ii) or (iii),

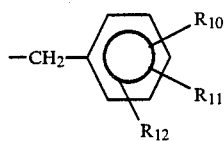

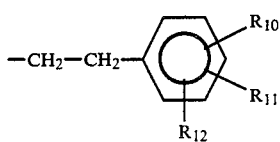

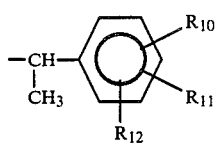

in which each of $R_{10}$, $R_{11}$ and $R_{12}$, independently, signifies a hydrogen, chlorine or bromine atom or a methyl, methoxy or ethoxy radical, and
$R_6$ signifies a ($C_{1-4}$)alkyl, ($C_{1-4}$)alkoxy($C_{2-4}$)alkyl or unsubstituted radical or a phenyl radical substituted by up to three substituents selected from the group consisting of chlorine and bromine atoms and methyl, methoxy and ethoxy radicals.

The present invention further provides a process for the production of compounds of formula I, as defined above, comprising coupling a diazotized amine of formula II,

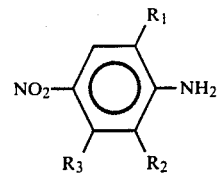

in which $R_1$, $R_2$ and $R_3$ are as defined above, with a compound of formula III,

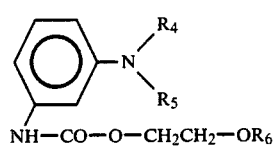

in which $R_4$, $R_5$ and $R_6$ are as defined above.

The coupling reaction is carried out according to conventional methods. Suitably, the reaction may be carried out in acid medium, with or without buffers, for example at a pH range of less than 5. Suitable buffers include alkali metal salts of low molecular weight alkanoic acids, for example, alkali metal salts of acetic or propionic acid. The preferred buffer is sodium acetate.

The reaction temperature is generally below 20° C., preferably between —5° and +5° C.

Diazotization of the amine of formula II may be carried out by known methods.

In the compounds of formula I, when any of $R_4$ and $R_5$ signifies a radical of formula (i), (ii) or (iii), preferably at least two of $R_{10}$, $R_{11}$ and $R_{12}$ signify hydrogen atoms. Furthermore, when $R_6$ signifies a substituted phenyl radical, it is preferably monosubstituted.

Representative compounds of formula I are those of formula I',

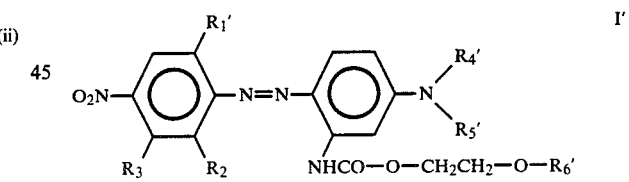

in which
$R_1'$ signifies a chlorine or bromine atom or a nitro or methylsulphonyl radical,
$R_2$ and $R_3$ are as defined above,
$R_4'$ signifies a ($C_{1-4}$)alkyl radical or a radical of formula (i)', (ii)' or (iii)'

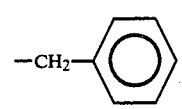

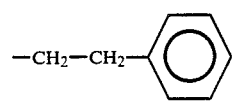

-continued

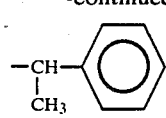
(iii)'

$R_5'$ signifies a $(C_{1-4})$alkyl radical, $R_6'$ signifies a $(C_{1-4})$alkyl radical, a $(C_{1-4})$alkoxy$(C_{2-4})$alkyl radical or a phenyl radical.

Especially preferred compounds are of formula I'',

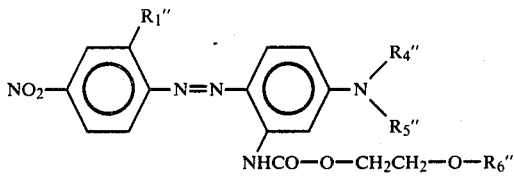
I'' in which $R_1''$ signifies a chlorine or bormine atom or a nitro group, $R_4''$ signifies a $(C_{2-4})$alkyl radical or a benzyl radical, $R_5''$ signifies a $(C_{2-4})$alkyl radical, and $R_6''$ signifies a $(C_{1-2})$alkyl radical or a $(C_{1-2})$alkoxyethyl radical.

The most preferred compounds of Formula I'' are those wherein $R_1''$ is chloro or bromo, $R_4''$ and $R_5''$ are ethyl or propyl, most preferably ethyl, and $R_6''$ is methyl, ethyl or methoxyethyl.

Further representative compounds of formula I, as defined above, are those of formula Ia,

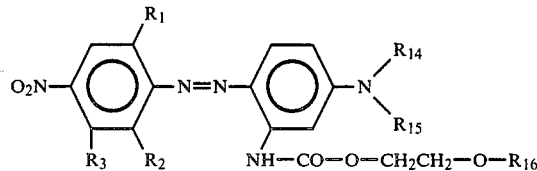
Ia in which $R_1$, $R_2$ and $R_3$ are as defined above, each of $R_{14}$ and $R_{15}$, independently, signifies a $(C_{1-4})$alkyl radical or a radical of formula (i), (ii) or (iii) as defined above, $R_{16}$ signifies a $(C_{1-4})$alkyl, $(C_{1-4})$alkoxy$(C_{2-4})$alkyl, unsubstituted phenyl or a phenyl radical substituted by up to three substituents selected from the group consisting of chlorine and bromine atoms and methyl, methoxy and ethoxy radicals, with the proviso that, when $R_{16}$ signifies a $(C_{1-4})$alkyl or $(C_{1-4})$alkoxy$(C_{2-4})$alkyl radical, either at least one of $R_{14}$ and $R_{15}$ signifies a radical of formula (i), (ii) or (iii) as defined above or $R_1$ signifies a $(C_{1-4}$alkyl)carbonyl or benzoyl radical.

Representative of the compounds of Formula Ia are those wherein at least one of $R_{14}$ and $R_{15}$ is a radical of formula (i), (ii) or (iii), as defined above, when $R_{16}$ is a $C_{1-4}$alkyl or $C_{1-4}$alkoxy$(C_{2-4}$alkyl) radical.

The most preferred compounds of Formula Ia are those wherein $R_1$ is chloro, bromo, nitro or methylsulfonyl, $R_{14}$ is $C_{2-4}$alkyl, benzyl, 1-phenylethyl or 2-phenylethyl, $R_{15}$ is $C_{2-4}$alkyl, and $R_{16}$ is $C_{1-2}$alkyl, $(C_{1-2}$alkoxy)ethyl, phenyl or phenyl monosubstituted by chloro, bromo, methyl, methoxy or ethoxy, with the proviso that $R_{14}$ is benzyl, 1-phenylethyl or 2-phenylethyl when $R_{16}$ is $C_{1-2}$alkyl or $(C_{1-2}$-alkoxy)ethyl.

In the compounds of formula Ia, when any of $R_{14}$ and $R_{15}$ signifies a radical of formula (i), (ii) or (iii), preferably at least two of $R_{10}$, $R_{11}$ and $R_{12}$ signifies hydrogen atoms. Furthermore, when $R_{16}$ signifies a substituted phenyl radical, such phenyl radical is preferably monosubstituted.

In the compounds of formula Ia, preferably, each of $R_{14}$ and $R_{15}$, independently, signifies $(C_{1-4})$alkyl or a radical of formula (i)', (ii)' or (iii)', as defined above, and $R_{16}$ signifies a $(C_{1-4})$alkyl, $(C_{1-4})$alkoxy$(C_{2-4})$alkyl or phenyl radical, with the proviso that when $R_{16}$ signifies a $(C_{1-4})$alkyl or $(C_{1-4})$alkoxy$(C_{2-4})$alkyl radical at least one of $R_{14}$ and $R_{15}$ signifies a radical of formula (i)', (ii)' or (iii)'.

Preferably, any alkyl radical in the significances of $R_{14}$ and $R_{15}$ contains 2 to 4 carbon atoms and any alkyl radical or alkoxy radical in the significances of $R_{16}$ contains 1 to 2 carbon atoms, with the proviso that when $R_{16}$ signifies alkoxyalkyl such radical is an alkoxyethyl radical.

In the compounds of formula Ia, preferably $R_1$ signifies a chlorine or bromine atom or a nitro or methylsulphonyl radical, especially a chlorine or bromine atom or a nitro group.

All alkyl radicals in the molecule may be straight chain or branched.

The compounds of formula II, as defined above, are known or may be produced according to known methods.

The compounds of formula III, as defined above, are new but may be prepared from available starting materials in analogous manner to known similar compounds.

The compounds of formula I, as defined above, are useful as disperse dyes for dyeing substrates consisting of or comprising synthetic, semi-synthetic organic fibres of high molecular weight and hydrophobic character, such as linear or aromatic polyesters, cellulose 2½ acetate, cellulose triacetate and synthetic polyamides. The substrate may be in loose fibre, yarn or fabric form.

The compounds of formula I, as defined above, may be converted into dyeing preparations according to known methods, for example, by grinding in the presence of dispersing agents and/or fillers, optionally with subsequent vacuum or atomizer drying. The preparations are dispersed in a suitable volume of water for application by exhaust dyeing, pad dyeing or printing methods.

Conventional dyeing and printing methods are employed, for example those described in French Pat. No. 1,445,371.

The dyeings obtained have good all round fastness, with notable fastness to light, thermofixation, sublimation and pleating. They have notable wet fastness properties, for example, fastness to water, sea water, washing, perspiration and solvents, including dry cleaning liquors, and to lubricants, rubbing, cross-dyeing, ozone, gas fumes and chlorine. The dyeings are stable to the pre-cure and post-cure permanent press finishing processes and to soil release finishes. The dischargeability, the stability to reducing action in dyeing with wool (as demonstrated by the sodium sulphide reduction test), stability to pH (i.e. pH of 5–9) under high temperature (e.g. 130° C.) dyeing conditions and the reverse of wool and cotton are notable.

In comparison with the general class of compounds to which the compounds of the present invention belong, the compounds of the present invention exhibit notable take-up (build-up) on polyester substrates.

The following Examples serve to further illustrate the invention. In the Examples the parts are by weight and the temperatures are in degrees centigrade.

EXAMPLE 1

17.3 Parts of 1-amino-2-chloro-4-nitrobenzene are added to a mixture consisting of 60 parts of water and 40 parts of concentrated hydrochloric acid and the mixture is stirred at room temperature over the course of 3 hours. The resulting suspension is cooled by the addition of 100 parts of ice and diazotized at 0°–5° over the course of 2 hours with a solution of 6.9 parts of sodium nitrite in 30 parts of water. The mixture is stirred for a further 30 minutes and 5 parts of aminosulphonic acid are added to the resulting solution which is then filtered.

The resulting diazonium salt solution is very slowly added to a mixture consisting of 28 parts of 3-(2'-ethoxyethoxycarbonylamino)-1-N,N-diethylamino benzene, 50 parts of glacial acetic acid and 100 parts of ice. Sodium acetate is then added until the pH is in the range of from 2.0 to 2.5. The mixture is subsequently stirred at 0°–5° for 1 to 2 hours until the coupling is complete. The resulting dye is then filtered off, washed with water and dried. The resultant dye is of the formula

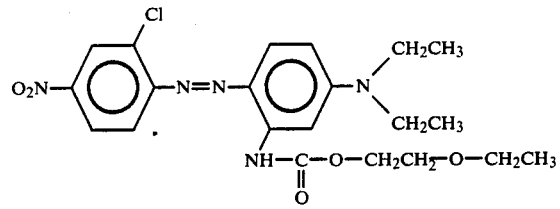

and dyes synthetic fibres in brilliant pink shades with notable fastness properties.

Further dyes which can be produced in accordance with Example 1 are shown in the following Tables.

TABLE 1

General formula:

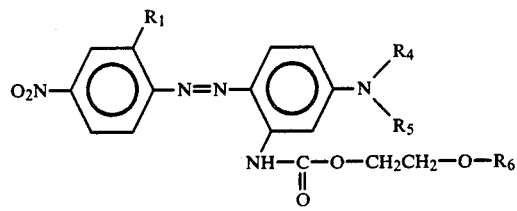

All dyes of Table 1 give dyeings of a brilliant pink shade on polyester fibres.

| Exp. No. | $R_1$ | $R_4$ | $R_5$ | $R_6$ |
|---|---|---|---|---|
| 2 | Br | —CH₂CH₃ | —CH₂CH₃ | —CH₂CH₃ |
| 3 | Cl | —CH₃ | —CH₃ | —CH₂CH₃ |
| 4 | Cl | —CH₂CH₂CH₂CH₃ | —CH₂CH₂CH₂CH₃ | —CH₂CH₃ |
| 5 | Cl | —CH₂CH₂CH₃ | —CH₂CH₂CH₃ | —CH₂CH₃ |
| 6 | Br | —CH₂CH₂CH₃ | —CH₂CH₂CH₃ | —CH₃ |
| 7 | Cl | —CH₃ | —CH₃ | —CH₂CH₂—O—CH₃ |
| 8 | Cl | —CH₂CH₃ | —CH₂CH₃ | —CH₂CH₂—O—CH₃ |
| 9 | Br | —CH₂CH₃ | —CH₂CH₃ | —CH₂CH₂—O—CH₃ |
| 10 | Br | —CH₂CH₃ | —CH₂—C₆H₅ | —CH₂CH₂—O—CH₃ |
| 11 | Cl | —CH₂CH₃ | —CH₂—C₆H₅ | —CH₂CH₂—O—CH₃ |
| 12 | Cl | —CH₂CH₃ | —CH₂—C₆H₅ | —CH₂CH₃ |
| 13 | Cl | —CH₂—C₆H₅ | —CH₂—C₆H₅ | —CH₂CH₃ |
| 14 | Cl | —CH₂CH₃ | —CH₂CH₂—C₆H₅ | —CH₂CH₃ |
| 15 | Br | —CH₂CH₃ | —CH₂CH₂—C₆H₅ | —CH₃ |
| 16 | Cl | —CH₂CH₃ | —CH(C₆H₅)CH₃ | —CH₂CH₃ |
| 17 | Cl | —CH₃ | —CH₂—C₆H₅ | —CH₂CH₂—O—CH₃ |
| 18 | Cl | —CH₃ | —CH₃ | —CH₂CH₂—O—CH₃ |
| 19 | Cl | —CH₃ | —CH₃ | —CH₃ |
| 20 | Cl | —CH₂CH₂—C₆H₅ | —CH₂CH₂—C₆H₅ | —CH₂CH₃ |
| 21 | Cl | —CH₂CH₃ | —CH(CH₃)—C₆H₅ | —CH₃ |
| 22 | Cl | —CH₂CH₃ | —CH₂CH₃ | —C₆H₅ |
| 23 | Cl | —CH₂CH₂CH₃ | —CH₂C₆H₅ | —CH₂CH₃ |
| 24 | Cl | —CH₂CH₂CH₂CH₃ | —CH₂C₆H₅ | —CH₂CH₃ |

TABLE 1-continued

General formula:

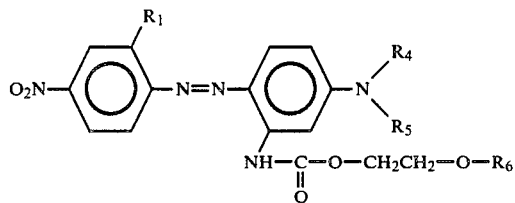

All dyes of Table 1 give dyeings of a brilliant pink shade on polyester fibres.

| Exp. No. | $R_1$ | $R_4$ | $R_5$ | $R_6$ |
|---|---|---|---|---|
| 25 | Cl | —CH$_2$CH$_3$ | —CH$_2$—C$_6$H$_4$—Cl | —CH$_2$CH$_3$ |

TABLE 2

General formula:

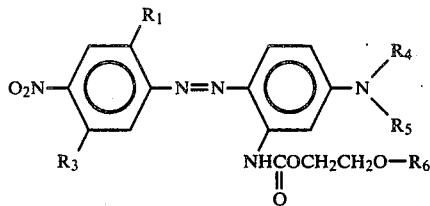

Shade on polyester: rubine/red.

| Exp. No. | $R_1$ | $R_3$ | $R_4$ | $R_5$ | $R_6$ |
|---|---|---|---|---|---|
| 26 | Cl | Cl | —CH$_2$CH$_3$ | —CH$_2$CH$_3$ | —CH$_2$CH$_3$ |
| 27 | Cl | Cl | —CH$_2$CH$_3$ | —CH$_2$CH$_3$ | —CH$_3$ |
| 28 | Cl | Cl | —CH$_2$CH$_3$ | —CH$_2$CH$_3$ | —CH$_2$CH$_2$—OCH$_3$ |
| 29 | Cl | Cl | —CH$_2$CH$_3$ | —CH$_2$CH$_3$ | —C$_6$H$_5$ |
| 30 | Br | Br | —CH$_2$CH$_3$ | —CH$_2$C$_6$H$_5$ | —CH$_2$CH$_3$ |
| 31 | Br | Br | —CH$_2$CH$_3$ | —CH$_2$CH$_3$ | —CH$_2$CH$_3$ |
| 32 | Br | Br | —CH$_2$CH$_3$ | —CH$_2$CH$_3$ | —CH$_2$CH$_2$—O—CH$_3$ |
| 33 | Cl | Cl | —CH$_2$CH$_3$ | —CH$_2$C$_6$H$_5$ | —CH$_2$CH$_2$—O—CH$_3$ |
| 34 | Cl | Cl | —CH$_2$CH$_3$ | —CH$_2$C$_6$H$_5$ | —CH$_2$CH$_3$ |
| 35 | Cl | Cl | —CH$_2$CH$_3$ | —CH$_2$C$_6$H$_5$ | —CH$_3$ |
| 36 | Cl | Cl | —CH$_2$CH$_2$CH$_3$ | —CH$_2$C$_6$H$_5$ | —CH$_2$CH$_3$ |
| 37 | Cl | Cl | —CH$_2$CH$_2$CH$_3$ | —CH$_2$CH$_2$CH$_3$ | —CH$_3$ |
| 38 | Cl | Cl | —CH$_2$CH$_2$CH$_3$ | —CH$_2$CH$_2$CH$_3$ | —C$_6$H$_5$ |
| 39 | Cl | Cl | —CH$_2$CH$_2$CH$_2$CH$_3$ | —CH$_2$CH$_2$CH$_2$CH$_3$ | —CH$_2$CH$_3$ |
| 40 | Cl | Cl | —CH$_2$CH$_2$CH$_2$CH$_3$ | —CH$_2$C$_6$H$_5$ | —CH$_2$CH$_3$ |
| 41 | Cl | Cl | —CH$_2$CH$_3$ | —CH(C$_6$H$_5$)CH$_3$ | —CH$_2$CH$_3$ |
| 42 | Cl | Cl | —CH$_2$—C$_6$H$_5$ | —CH$_2$C$_6$H$_5$ | —CH$_2$CH$_3$ |
| 43 | Cl | Cl | —CH$_2$CH$_2$—C$_6$H$_5$ | —CH$_2$CH$_2$—C$_6$H$_5$ | —CH$_3$ |
| 44 | Cl | Cl | —CH$_2$CH$_3$ | —CH(C$_6$H$_5$)CH$_3$ | —CH$_3$ |
| 45 | Cl | Cl | —CH$_3$ | —CH$_3$ | —CH$_2$CH$_3$ |
| 46 | Cl | Cl | —CH$_3$ | —CH$_3$ | —CH$_2$CH$_2$—O—CH$_3$ |

TABLE 2-continued

General formula:

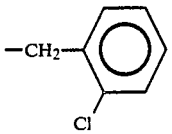

Shade on polyester: rubine/red.

| Exp. No. | $R_1$ | $R_3$ | $R_4$ | $R_5$ | $R_6$ |
|---|---|---|---|---|---|
| 47 | Cl | Cl | —$CH_3$ | —$CH_2$—(2-chlorophenyl) | —$CH_2CH_3$ |

TABLE 3

General formula:

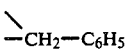

Shade on polyester: violet

| Exp. No. | $R_1$ | $R_2$ | $R_4$ | $R_5$ | $R_6$ |
|---|---|---|---|---|---|
| 48 | —$SO_2CH_3$ | Cl | —$CH_2CH_3$ | —$CH_2CH_3$ | —$CH_2CH_3$ |
| 49 | —$NO_2$ | Cl | " | " | " |
| 50 | —$NO_2$ | H | " | " | —$CH_3$ |
| 51 | " | H | " | " | —$CH_2CH_3$ |
| 52 | Cl | Cl | " | " | " |
| 53 | Cl | Cl | " | " | —$CH_3$ |
| 54 | Cl | Cl | " | " | —$C_6H_5$ |
| 55 | —$NO_2$ | Br | " | " | " |
| 56 | —$NO_2$ | Br | " | " | —$CH_2CH_3$ |
| 57 | " | " | " | —$CH_2$—$C_6H_5$ | " |
| 58 | " | " | —$CH_3$ | " | —$CH_2CH_2CH_2CH_3$ |

The dyes of Table 4 correspond to formula I.

TABLE 4

| Exp. No. | $R_1$ | $R_2$ | $R_3$ | $R_4$ | $R_5$ | $R_6$ | Shade on PE |
|---|---|---|---|---|---|---|---|
| 59 | Cl | H | H | —$CH_2CH_3$ | —$CH_2CH_3$ | —$CH_3$ | pink |
| 60 | Br | H | H | " | " | " | " |
| 61 | Cl | H | H | —$CH_2CH_2CH_3$ | —$CH_2CH_2CH_3$ | " | " |
| 62 | —$SO_2$—$C_6H_5$ | H | H | —$CH_2CH_3$ | —$CH_2CH_3$ | " | violet |
| 63 | " | H | Cl | " | " | —$CH_2CH_3$ | " |
| 64 | —$COCH_3$ | H | H | " | " | " | pink |
| 65 | " | Cl | H | " | " | " | violet |
| 66 | —$CO$—$C_6H_5$ | H | H | " | " | " | pink |
| 67 | " | Br | H | " | " | —$CH_2CH_2OCH_3$ | violet |
| 68 | —$SO_2CH_2CH_3$ | H | H | " | " | " | " |
| 69 | " | H | Cl | " | " | —$CH_2CH_2OCH_2CH_3$ | " |
| 70 | Cl | H | H | " | " | —$CH_2CH_2OCH_2CH_3$ | pink |
| 71 | Cl | H | H | " | " | —(4-chlorophenyl) | " |

TABLE 4-continued
| Exp. No. | R₁ | R₂ | R₃ | R₄ | R₅ | R₆ | Shade on PE |
|---|---|---|---|---|---|---|---|
| 72 | Cl | H | H | " | " | 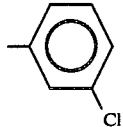 | " |
| 73 | Cl | H | H | " | " | 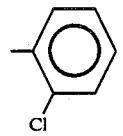 | " |
| 74 | Cl | H | H | " | " | 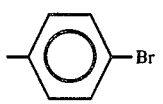 | " |
| 75 | Br | H | H | " | " | " | " |
| 76 | Br | H | H | " | " | 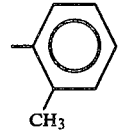 | " |
| 77 | Cl | H | H | " | " | 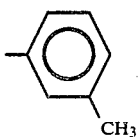 | " |
| 78 | Cl | H | H | " | " | 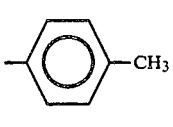 | " |
| 79 | Cl | H | H | " | " | 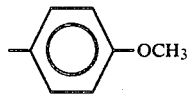 | " |
| 80 | Cl | H | H | " | " | 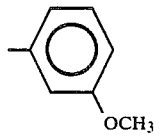 | " |
| 81 | Cl | H | H | " | " | 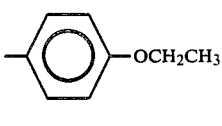 | " |
| 82 | Cl | H | H | " | " | —CH₂CH₂CH₃ | " |
| 83 | —NO₂ | H | H | " | " | " | violet |
| 84 | —NO₂ | H | H | " | " | —CH₂CH₂—OCH₃ | " |
| 85 | Cl | H | H | " | " | —CH(CH₃)₂ | pink |
| 86 | Br | H | H | " | " | —CH₂CH₂CH₂CH₃ | " |
| 87 | Cl | H | H | " | " | —CH₂CH(CH₃)₂ | " |
| 88 | Cl | Cl | H | " | —CH₂—C₆H₅ | —CH₂CH₂—O—CH₃ | violet |
| 89 | Cl | H | H | " | 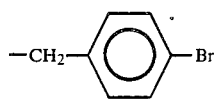 | —CH₂CH₃ | pink |

TABLE 4-continued

| Exp. No. | $R_1$ | $R_2$ | $R_3$ | $R_4$ | $R_5$ | $R_6$ | Shade on PE |
|---|---|---|---|---|---|---|---|
| 90 | Cl | H | H | " | $-CH_2-C_6H_4-OCH_3$ | " | " |
| 91 | Cl | H | H | " | $-CH_2-C_6H_4-CH_3$ | " | " |
| 92 | Cl | H | H | " | $-CH_2-CH_2-C_6H_4-Br$ | " | " |
| 93 | Cl | H | H | " | $-CH_2CH_2-C_6H_4-OCH_2CH_3$ | " | " |
| 94 | Cl | H | H | $-CH_2-C_6H_4-Cl$ | $-CH_2-C_6H_4-Cl$ | " | " |
| 95 | Cl | H | H | $-CH_2-C_6H_4-OCH_3$ | $-CH_2-C_6H_5$ | " | " |
| 96 | Cl | H | H | $-CH_2-C_6H_4-CH_3$ | " | " | " |
| 97 | Cl | H | H | $-CH_2-C_6H_4-OCH(CH_3)$ | $-CH_2-C_6H_4-O-CH_2CH_3$ | " | " |
| 98 | Cl | H | H | $-CH_2CH(CH_3)_2$ | $-CH_2-C_6H_5$ | $-CH_3$ | " |
| 99 | Br | H | H | " | $-CH_2CH_2-C_6H_5$ | " | " |
| 100 | Cl | H | H | $-CH_2CH_3$ | $-CH_2-C_6H_5$ | $-C_6H_4-Cl$ | " |
| 101 | Cl | H | H | " | " | $-C_6H_4-Br$ | " |
| 102 | CL | H | H | " | " | $-C_6H_4-CH_3$ | " |
| 103 | Cl | H | H | " | " | $-C_6H_4-OCH_3$ | " |

TABLE 4-continued

| Exp. No. | $R_1$ | $R_2$ | $R_3$ | $R_4$ | $R_5$ | $R_6$ | Shade on PE |
|---|---|---|---|---|---|---|---|
| 104 | Cl | H | H | " | " | 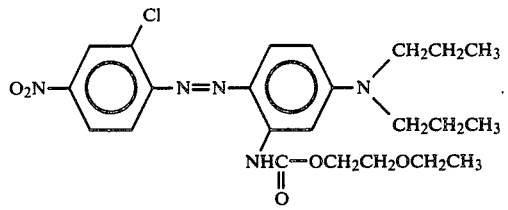 | " |
| 105 | Br | H | H | " | " | 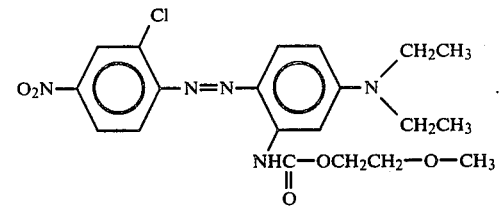 | " |
| 106 | Cl | H | H | " | " | —$C_6H_5$ | " |

EXAMPLE A

7 Parts of the dye of Example 1, 4 parts of sodium dinaphthylmethanedisulphonate, 4 parts of sodium cetyl sulphate and 5 parts of anhydrous sodium sulphate are ground in a ball mill for 48 hours to give a fine powder.

1 Part of the powder is dispersed in a small amount of water and the dispersion is added through a sieve to a bath of 4000 parts of water containing 3 parts of sodium lauryl sulphate. The liquor ratio is 1:40. At 40°–50°, 100 parts of a second fabric of polyester fibre are entered into this dyebath, which is then set with an emulsion of 20 parts of a chlorinated benzene in water. The bath is raised slowly to 100° and the fabric dyed for 1 to 2 hours at 95°–100°. The fabric, which is dyed in brilliant pink shades, is washed, soaped, washed again and dried. The level dyeing has notable fastness to light, cross dyeing, washing, water, sea water, perspiration, sublimation, gas fumes, thermofixation, pleating and permanent press finishing.

What is claimed is:

1. A compound of the formula

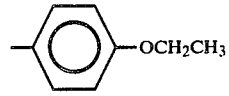

wherein
$R_1''$ is chloro or bromo,
each $R_4''$ is ethyl or propyl, and
$R_6''$ is methyl, ethyl or 2-methoxyethyl.

2. A compound according to claim 1 wherein each $R_4''$ is ethyl.

3. The compound according to claim 2 having the formula

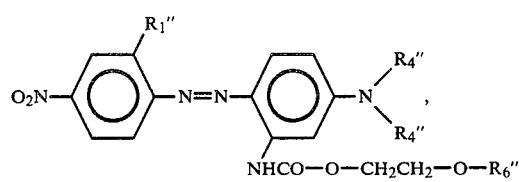

4. The compound according to claim 1 having the formula

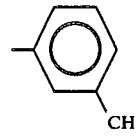

5. The compound according to claim 2 having the formula

6. The compound according to claim 2 having the formula

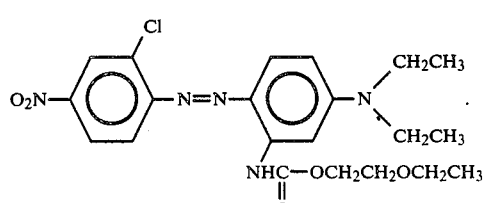

7. The compound according to claim 2 having the formula

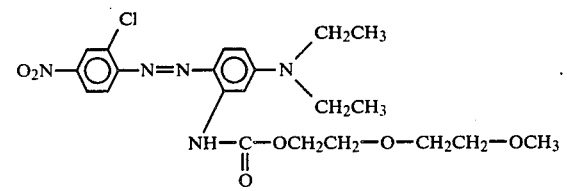

8. The compound according to claim 2 having the formula

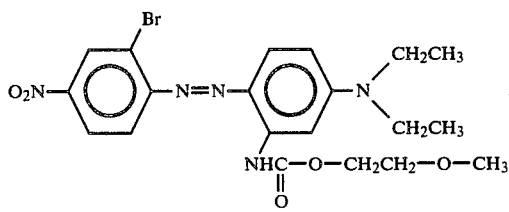

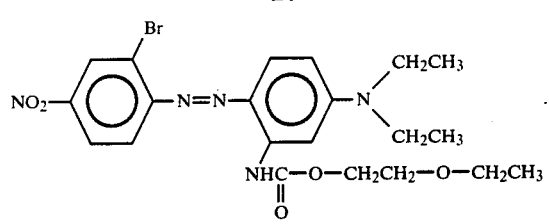
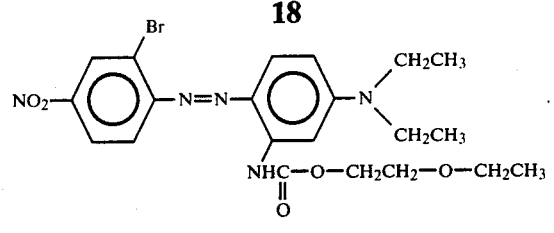
* * * * *